US012603382B2

(12) United States Patent
Li et al.

(10) Patent No.: US 12,603,382 B2
(45) Date of Patent: Apr. 14, 2026

(54) BATTERY CELL, BATTERY, AND ELECTRICAL DEVICE

(71) Applicant: CONTEMPORARY AMPEREX TECHNOLOGY (HONG KONG) LIMITED, Hong Kong (CN)

(72) Inventors: Chuan Li, Ningde (CN); Yuyong Lei, Ningde (CN); Zhijun Guo, Ningde (CN); Shengyun Shi, Ningde (CN); Yingjun Song, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 209 days.

(21) Appl. No.: 18/741,799

(22) Filed: Jun. 13, 2024

(65) Prior Publication Data

US 2024/0332721 A1 Oct. 3, 2024

Related U.S. Application Data

(63) Continuation of application No. PCT/CN2022/134007, filed on Nov. 24, 2022.

(30) Foreign Application Priority Data

Jan. 24, 2022 (CN) .......................... 202220191516.9

(51) Int. Cl.
*H01M 50/593* (2021.01)
*H01M 50/249* (2021.01)
(Continued)

(52) U.S. Cl.
CPC ..... *H01M 50/3425* (2021.01); *H01M 50/249* (2021.01); *H01M 50/367* (2021.01);
(Continued)

(58) Field of Classification Search
CPC ................................................. H01M 50/3425
See application file for complete search history.

(56) References Cited

FOREIGN PATENT DOCUMENTS

CN 102544411 A 7/2012
CN 205863226 U 1/2017
(Continued)

OTHER PUBLICATIONS

Machine translation of CN_207474504U from Espacenet (Year: 2018).*

(Continued)

*Primary Examiner* — Nicholas A Smith
*Assistant Examiner* — Zackary Richard Cochenour
(74) *Attorney, Agent, or Firm* — K&L Gates LLP

(57) ABSTRACT

Provided are a battery cell, a battery and an electrical device. The battery cell comprises an electrode assembly, a shell, a pressure relief mechanism and a support plate; the pressure relief mechanism is arranged on the first side plate and is configured to be actuated when the internal pressure of the battery cell reaches a first threshold, so as to release the internal pressure; the support plate is arranged between the first side plate and the electrode assembly; the support plate is provided with a weak portion which is opposite to the pressure relief mechanism in the thickness direction of the first side plate; the shape of the weak portion is the same as that of the outline of the pressure relief mechanism, and the external dimension of the weak portion is not greater than the dimension of the outline of the pressure relief mechanism.

13 Claims, 5 Drawing Sheets

A

(51) Int. Cl.
| | |
|---|---|
| *H01M 50/342* | (2021.01) |
| *H01M 50/367* | (2021.01) |
| *H01M 50/578* | (2021.01) |

(52) U.S. Cl.
CPC ....... *H01M 50/578* (2021.01); *H01M 50/593* (2021.01); *H01M 2200/20* (2013.01)

(56) References Cited

FOREIGN PATENT DOCUMENTS

| CN | 107394063 A | 11/2017 |
|---|---|---|
| CN | 207474504 U | 6/2018 |
| CN | 208521981 U | 2/2019 |
| CN | 211017216 U | 7/2020 |
| CN | 111933833 A | 11/2020 |
| CN | 112018321 A | 12/2020 |
| CN | 112018462 A | 12/2020 |
| CN | 212380469 U | 1/2021 |
| CN | 213546446 U | 6/2021 |
| CN | 113383457 A | 9/2021 |
| CN | 214898799 U | 11/2021 |
| CN | 216720178 U | 6/2022 |
| JP | 2009004271 A | 1/2009 |
| JP | 2011204469 A | 10/2011 |
| JP | 2016095930 A | 5/2016 |
| WO | 2018131417 A1 | 7/2018 |

OTHER PUBLICATIONS

International Search Report received in the corresponding international application PCT/CN2022/101110, mailed on Oct. 10, 2022.
International Search Report received in the corresponding international application PCT/CN2022/134007, mailed on Jan. 20, 2023.
The extended European search report received in the counterpart EP application 22921633.8, dated Apr. 24, 2025, 7 pages.

* cited by examiner

1000

100

26

A

28

B

29

28

BATTERY CELL, BATTERY, AND ELECTRICAL DEVICE

CROSS-REFERENCE TO RELATED APPLICATION

The present application is a continuation of International Application PCT/CN2022/134007, filed on Nov. 24, 2022, which claims the priority of Chinese Patent Application 202220191516.9 filed on Jan. 24, 2022 and entitled "BATTERY CELL, BATTERY, AND ELECTRICAL DEVICE", the entire contents of which are incorporated herein by reference.

TECHNICAL FIELD

The present application relates to the technical field of batteries, and specifically, to a battery cell, a battery, and an electrical device.

BACKGROUND

Battery cells are widely used in electronic devices, such as electric cars, electric planes, electric ships, mobile phones, laptops, electric toys, electric tools, etc. Battery cells may include nickel-cadmium battery cells, nickel-hydrogen battery cells, lithium-ion battery cells, secondary alkaline zinc-manganese battery cells, and the like.

Currently, in the research on battery cells and batteries, in addition to improving the conversion efficiency and performance of battery cells, improving the safety of battery cells is also an important research content. If the safety performance of a battery cell or a battery cannot be guaranteed, its application will be limited. Therefore, how to improve the safety performance of a battery is an urgent problem to be solved in the field.

SUMMARY OF THE INVENTION

In view of the above problems, the present application provides a battery cell, a battery and an electrical device, which can effectively improve the safety of the battery cell.

In a first aspect, the present application provides a battery cell, including: an electrode assembly, a shell, a pressure relief mechanism and a support plate. The shell is used for accommodating the electrode assembly and includes a first side plate; the pressure relief mechanism is disposed on the first side plate, and is configured to be actuated when the internal pressure of the battery cell reaches a first threshold, so as to release the internal pressure; the support plate is disposed between the first side plate and the electrode assembly, the support plate is provided with a weak portion, the weak portion is opposite to the pressure relief mechanism in the thickness direction of the first side plate, the shape of the weak portion is the same as that of the outline of the pressure relief mechanism, the external dimension of the weak portion is not larger than the dimension of the outline of the pressure relief mechanism, and the support plate is configured to rupture along the weak portion when the internal pressure of the battery cell reaches a second threshold, so as to form a channel for guiding fluid to the pressure relief mechanism.

In the technical solution of the embodiment of the present application, by arranging a weak portion on the support plate and arranging the weak portion corresponding to the pressure relief mechanism, the fluid released by the battery cell during thermal runaway can be guided to the pressure relief mechanism, so that the pressure relief mechanism is actuated in time and discharges the internal fluid. Moreover, the shape of the weak portion is the same as that of the outline of the pressure relief mechanism, and the external dimension of the weak portion is not larger than the dimension of the outline of the pressure relief mechanism, which can ensure that the fluid is accurately guided to the pressure relief mechanism, and uneven pressure release caused by fluid deposition in the shell can be prevented. Therefore, the above components can effectively increase the discharge rate of internal fluid when the battery cell undergoes thermal runaway, and improve the safety performance of the battery cell.

In some embodiments, the first threshold P1 and the second threshold P2 satisfy the relationship P2<P1. According to the embodiment of the present application, the second threshold is set to be less than the first threshold, which can ensure that under the same internal pressure condition, the weak portion on the support plate ruptures before the pressure relief mechanism, or the weak portion on the support plate and the pressure relief mechanism can rupture at the same time, thereby ensuring that the fluid in the battery cell can be discharged smoothly.

In some embodiments, the support plate includes a first portion, a second portion and a first weak portion, the first portion is disposed opposite to the pressure relief mechanism, the second portion surrounds the outside of the first portion, and the first weak portion is connected between the first portion and the second portion. In the above structure, the first portion and the second portion are connected by arranging the first weak portion, so that the structural integrity of the support plate is ensured when the internal pressure of the battery cell does not exceed the second threshold, and the second part is arranged to surround the outside of the first portion, so that when the internal pressure of the battery cell exceeds the second threshold, the second portion is uniformly stressed in the circumferential direction and ruptures smoothly.

In some embodiments, an insulating sheet is also included. The insulating sheet includes a third portion, a fourth portion and a second weak portion. The third portion is arranged opposite to the first portion, the fourth portion surrounds the outside of the third portion, and the second weak portion is connected between the third portion and fourth portion. In the above structure, the third portion and the fourth portion are connected by arranging the second weak portion, so that when the internal pressure of the battery cell does not exceed the second threshold, the normal structural form of the insulating sheet is maintained. Moreover, the fourth portion is arranged to surround the outside of the third portion, and when the internal pressure of the battery cell exceeds the second threshold, the fourth portion is uniformly stressed in the circumferential direction and ruptures smoothly.

In some embodiments, the orthographic projection of the first weak portion on the first side plate completely falls within the range of the pressure relief mechanism, and/or the orthographic projection of the second weak portion on the first side plate completely falls within the range of the pressure relief mechanism. The orthographic projections of the first weak portion and the second weak portion on the first side plate both fall within the range of the pressure relief mechanism. After the first portion and the third portion rupture, through holes are formed in the insulating sheet and the support plate respectively, and the fluid inside the battery cell can flow along the through holes to the pressure relief hole and be discharged from the pressure relief hole. The above structure can play a role in guiding the flow.

In some embodiments, the support plate includes a plurality of first through holes spaced along the circumference of the first portion, and the first through hole penetrates through the support plate along the thickness direction of the first side plate; a first connecting section exists between two adjacent first through holes, and a plurality of first connecting sections and a plurality of first through holes are alternately arranged along the circumference of the first portion and form the first weak portion. By arranging the first connecting section, the first portion and the second portion are connected to ensure the structural integrity of the support plate before it ruptures; and arranging the first through holes reduces the strength of the first weak portion of the support plate and ensures that the first portion can be smoothly detached from the second portion along the first weak portion when the internal pressure of the battery cell reaches the second threshold.

In some embodiments, the insulating sheet includes a plurality of second through holes arranged along the circumference of the third portion, and the second through hole penetrates through the insulating sheet along the thickness direction of the first side plate; a second connecting section exists between two adjacent second through holes, and a plurality of second connecting sections and a plurality of second through holes are alternately arranged along the circumference of the third portion and form the second weak portion. By arranging the second connecting section, the third portion and the fourth portion are connected to ensure the structural integrity of the insulating sheet before it ruptures and the insulation performance between the electrode assembly and the shell; and arranging the first through holes reduces the strength of the second weak portion and ensures that the third portion can be smoothly detached from the fourth portion along the second weak portion when the internal pressure of the battery cell reaches the second threshold.

In some embodiments, the thickness of the first connecting section is less than the thickness of the second section, and/or the thickness of the second connecting section is less than the thickness of the fourth section. By reducing the thickness of the first connecting section, the connection strength between the first portion and the second portion is changed, and by adjusting the thickness of the second connecting section, the connection strength between the third portion and the fourth portion can be changed.

In some embodiments, the orthographic projection of the second weak portion on the support plate completely falls within the range of the first portion. The above structure can centrally guide the fluid inside the battery cell to the through hole after the first portion of the support plate is detached, which plays a role of guiding the flow and ensures the insulation performance of the insulating plate.

In some embodiments, the orthographic projections of the plurality of second through holes on the support plate and the plurality of first through holes are staggered on the support plate. By arranging the first through holes and the second through holes in a staggered distribution, the insulation performance of the insulating sheet is ensured.

In some embodiments, in the thickness direction of the first side plate, the surface of the first weak portion facing the first side plate is recessed in a direction away from the first side plate relative to the surface of the first portion facing the first side plate, and/or the surface of the first weak portion facing the electrode assembly is recessed in a direction away from the electrode assembly relative to the surface of the first portion facing the electrode assembly. By arranging the first weak portion as an inwardly concave groove, the thickness of the first weak portion is reduced, and the connection strength of the first weak portion is reduced, so that the first weak portion can rupture smoothly when the internal pressure reaches the second threshold.

In some embodiments, in the thickness direction of the first side plate, the surface of the second weak portion facing the first side plate is recessed in a direction away from the first side plate relative to the surface of the first portion facing the first side plate, and/or the surface of the second weak portion facing the electrode assembly is recessed in a direction away from the electrode assembly relative to the surface of the first portion facing the electrode assembly. By arranging the second weak portion as an inwardly concave groove, the thickness of the second weak portion is reduced, and the connection strength of the second weak portion is reduced, so that the second weak portion can rupture smoothly when the internal pressure reaches the second threshold.

In some embodiments, the orthographic projection of the first weak portion on the first side plate is any one of circular, elliptical, square and racetrack shape, and/or the orthographic projection of the second weak portion on the first side plate is any one of circular, elliptical, square and racetrack shape. In the above structure, the weak portion is designed into a specific shape to facilitate production.

In a second aspect, the present application provides a battery, including the battery cell in the above embodiment.

In a third aspect, the present application provides an electrical apparatus, including the battery in the above embodiment, the battery being configured to provide electric energy.

The above description is only an overview of the technical solutions of the present application. In order to more clearly understand the technical means of the present application to implement same according to the contents of the specification, and in order to enable the above and other objectives, features and advantages of the present application to be more obvious and understandable, Detailed Description of the present application is exemplarily described below.

DESCRIPTION OF DRAWINGS

The features, advantages and technical effects of exemplary embodiments of the present application will be described below with reference to the accompanying drawings.

DESCRIPTION OF REFERENCE NUMERALS

Figure 1:
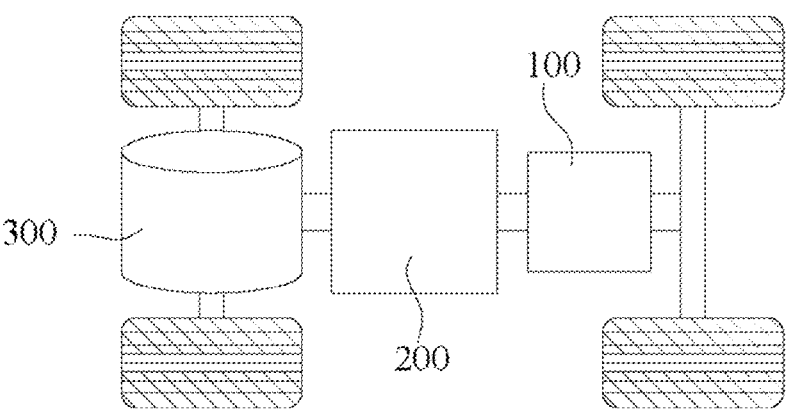
FIG. 1 is a schematic structural diagram of a vehicle according to some embodiments of the present application.

1000. Vehicle; 100. Battery; 200. Controller; 300. Motor; 10. Box; 11. First box body; 12. Second box body; 20. Battery cell; 21. End cover assembly; 22. Case; 23. Electrode assembly; 24. Pressure relief mechanism; 25. Electrode terminal; 26. Shell; 27. First side plate; 28. Support plate; 2801. Weak portion; 2802. First portion; 2803. Second portion; 2804. First weak portion; 2805. First through hole; 2806. First connecting section; 2807. First groove; 29. Insulating sheet; 2901. Third portion; 2902. Fourth portion; 2903. Second weak portion.

DETAILED DESCRIPTION

Embodiments of the technical solutions of the present application will be described in detail below in conjunction with the drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific examples and are not intended to limit the present application; the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is only an association relationship for describing associated objects, indicating that there may be three relationships, for example A and/or B may represent three situations: A exists alone, both A and B exist, and B exists alone. In addition, the character "/" herein generally means that the associated objects before and after it are in an "or" relationship.

In the description of the embodiments of the present application, the term "a plurality of" refers to two or more (including two), and similarly, "multiple groups" refers to two or more (including two) groups, and "multiple sheets" refers to two or more (including two) sheets.

In the descriptions of the embodiments of present application, orientations or positional relationships indicated by the technical terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential" and the like are orientations or positional relationships as shown in the drawings, and are only for the purpose of facilitating and simplifying the descriptions of the embodiments of the present application instead of indicating or implying that devices or elements indicated must have particular orientations, and be constructed and operated in the particular orientations, so that these terms are not construed as limiting the embodiments of the present application.

In the description of the embodiments of the present application, unless otherwise expressly specified and limited, the technical terms "mount," "join," "connect," "fix," etc. should be understood in a broad sense, such as, a fixed connection, a detachable connection, or an integral connection; a mechanical connection, or an electrical connection; a direct connection, an indirect connection through an intermediate medium, an internal connection of two elements, or interaction between two elements. For those of ordinary skill in the art, the specific meanings of the above terms in the embodiments of the present application can be understood according to specific situations.

For battery cells, the main danger comes from the charging and discharging process. In order to effectively avoid unnecessary losses, battery cells generally have at least three protection measures. Specifically, the protection measures at least include switching elements, selecting appropriate spacer materials and pressure relief mechanisms. A switching element refers to an element that can prevent the battery from charging or discharging in time when the temperature or resistance inside the battery cell reaches a certain threshold. The spacer is used to isolate the positive electrode plate and the negative electrode plate, and can automatically dissolve the micron-sized (or even nano-sized) micropores attached to it when the temperature rises to a certain value, so that metal ions cannot pass through the spacer to terminate the reactions inside the battery cell.

The pressure relief mechanism refers to an element or component that is actuated to release the internal pressure of the battery cell when the internal pressure reaches a predetermined threshold. The threshold design varies depending on the requirements. The threshold above may depend on the materials of one or more of the positive electrode plate, the negative electrode plate, the electrolyte solution, and the spacer in the battery cell. The pressure relief mechanism may take the form of an explosion-proof valve, a gas valve, a pressure relief valve, a safety valve, or the like, and may specifically adopt a pressure-sensitive element or structure. That is, when the internal pressure of the battery cell reaches a predetermined threshold, the pressure relief mechanism performs an action or a weak structure arranged in the pressure relief mechanism is broken, so as to form an opening or channel for relieving the internal pressure or temperature.

The "actuate" mentioned above means that the pressure relief mechanism performs an action or is activated to a certain state, so that the internal pressure of the battery cell can be released. The action performed by the pressure relief mechanism may include, but is not limited to: at least a part of the pressure relief mechanism being broken, crushed, torn, opened, or the like. When the pressure relief mechanism is actuated, the high-temperature and high-pressure substances in the battery cell will be discharged from the actuated position as emissions, so that the pressure of the battery cell can be released under the condition of controllable pressure, thus avoiding potential more serious accidents.

The emissions from the battery cell mentioned in the embodiments of the present application include, but are not limited to, the electrolyte solution, dissolved or split positive and negative electrode plates, fragments of the spacer, high-temperature and high-pressure gas generated by reaction, flames, and the like.

A pressure relief mechanism on the battery cell has an important impact on the safety performance of the battery cell. For example, when short circuit, overcharge, and the like occur, thermal runaway may occur inside the battery cell and the pressure may rise suddenly. In this case, the internal pressure can be released outward through the actuation of the pressure relief mechanism timely, so as to prevent explosion and fire of the battery cell.

The pressure relief mechanism is usually installed on the shell, and a support plate is usually provided between the shell and the electrode assembly. The support plate is used to support the electrode assembly and form a certain gap between the electrode assembly and the shell.

During the research process, the inventor of the present application found that the space for gas flow inside the battery cell is limited, resulting in a low rate of internal fluid discharge when thermal runaway occurs. The flow rate of the fluid is limited mainly because the pressure relief mechanism is blocked by the support plate, resulting in poor fluid discharge and safety accidents.

Based on the above considerations, in order to increase the discharge rate of fluid inside the battery cell, the inventor researched and designed a technical solution. In this technical solution, the battery cell includes an electrode assembly, a shell, a pressure relief mechanism and a support plate. The shell is used for accommodating the electrode assembly and includes a first side plate; the pressure relief mechanism is disposed on the first side plate, and is configured to be actuated when the internal pressure of the battery cell reaches a first threshold, so as to release the internal pressure; the support plate is disposed between the first side plate and the electrode assembly, the support plate is provided with a weak portion, the weak portion is opposite to the pressure relief mechanism in the thickness direction of the first side plate, the shape of the weak portion is the same as that of the outline of the pressure relief mechanism, the external dimension of the weak portion is not larger than the dimension of the outline of the pressure relief mechanism, and the support plate is configured to rupture along the weak portion when the internal pressure of the battery cell reaches a second threshold, so as to form a channel for guiding fluid to the pressure relief mechanism.

In the technical solution of the embodiment of the present application, by arranging a weak portion on the support plate and arranging the weak portion corresponding to the pressure relief mechanism, the fluid released by the battery cell during thermal runaway can be guided to the pressure relief mechanism, so that the pressure relief mechanism is actuated in time and releases the fluid. Moreover, the shape of the weak portion is the same as that of the outline of the pressure relief mechanism, and the external dimension of the weak portion is not larger than the dimension of the pressure relief mechanism, which can ensure that the fluid is accurately guided to the pressure relief mechanism, and uneven pressure release caused by fluid deposition in the space between the shell and the support plate can be prevented. Therefore, the above components can effectively increase the discharge rate when the battery cell undergoes thermal runaway, and improve the safety performance of the battery cell.

The battery cell and the battery disclosed in the embodiments of the present application can be used, but not limited to, in electrical apparatuses such as a vehicle, a ship, or an aircraft. The power supply system of the electrical apparatus can be constituted with the battery cell, battery, etc. disclosed in the present application, so as to improve the discharge rate of the fluid inside the battery cell and improve the safety performance of the battery cell and the battery.

Embodiments of the present application provide an electrical apparatus that uses a battery as a power supply, and the electrical apparatus may be, but is not limited to, a mobile phone, a tablet, a laptop, an electric toy, an electric tool, a battery vehicle, an electric vehicle, a ship, a spacecraft, and so on. The electric toy may include fixed or mobile electric toys, such as game consoles, electric vehicle toys, electric ship toys, and electric airplane toys. The spacecraft may include airplanes, rockets, space shuttles, spaceships, etc.

For the convenience of description in the following embodiments, an electrical apparatus being a vehicle 1000 according to an embodiment of the present application is taken as an example for the description.

Referring to FIG. 1, FIG. 1 is a schematic structural diagram of a vehicle 1000 according to some embodiments of the present application. The vehicle 1000 may be a fuel vehicle, a gas vehicle, or a new energy vehicle, and the new energy vehicle may be an all-electric vehicle, a hybrid electric vehicle, an extended range electric vehicle, etc. The vehicle 1000 is internally provided with a battery 100, and the battery 100 may be arranged at the bottom or head or tail of the vehicle 1000. The battery 100 may be used to supply power to the vehicle 1000. For example, the battery 100 may be used as an operating power source of the vehicle 1000. The vehicle 1000 may further include a controller 200 and a motor 300. The controller 200 is used to control the battery 100 to power the motor 300, for example, to meet working power demands during starting, navigation and driving of the vehicle 1000.

In some embodiments of the present application, the battery 100 not only may serve as an operating power source of the vehicle 1000, but also may serve as a driving power source of the vehicle 1000, thus replacing or partially replacing fuel or natural gas to provide driving power for the vehicle 1000.

Figure 2:
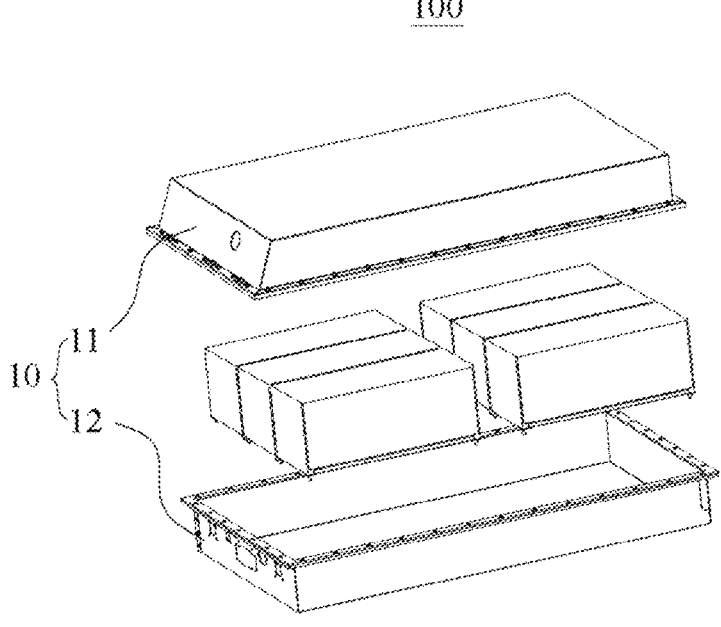
FIG. 2 is an exploded schematic structural diagram of a battery according to some embodiments of the present application.

Referring to FIG. 2, FIG. 2 is an exploded view of a battery 100 according to some embodiments of the present application. The battery 100 includes a box 10 and battery cells 20, and the battery cells 20 are accommodated in the box 10. The box 10 is used to provide an accommodating space for the battery cells 20, and the box 10 can be of various structures. In some embodiments, the box 10 includes a first box body 11 and a second box body 12. The first box body 11 and the second box body 12 are covered by each other, and the first box body 11 and the second box body 12 together define an accommodating space for accommodating the battery cells 20. The second box body 12 may be of a hollow structure with one end open, the first box body 11 may be of a plate-like structure, and the first box body 11 covers the opening side of the second box body 12, so that the first box body 11 and the second box body 12 together define the accommodating space. Both of the first box body 11 and the second box body 12 may also be of a hollow structure with one side open, and the opening side of the first box body 11 covers the opening side of the second box body 12. Of course, the box 10 formed by the first box body 11 and the second box body 12 may be in various shapes, such as a cylinder or a cuboid.

In the battery 100, there may be a plurality of battery cells 20, and the plurality of battery cells 20 may be connected in series or parallel or in a parallel-series connection, and the parallel-series connection means that the plurality of battery cells 20 are connected in both series and parallel. The plurality of battery cells 20 may be directly connected in series or parallel or parallel-series connection, and then an entirety composed of the plurality of battery cells 20 may be accommodated in the box 10. Of course, the battery 100 may also be achieved by first connecting a plurality of battery cells 20 in series or in parallel or in parallel-series connection to form a battery module, and connecting a plurality of battery modules in series or in parallel or in parallel-series connection to form a whole that is accommodated in the box 10. The battery 100 may further include other structures. For example, the battery 100 may further include a convergence component for electrically connecting the plurality of battery cells 20.

Each battery cell 20 may be a secondary battery or a primary battery; and may also be a lithium-sulfur battery, a sodium-ion battery or a magnesium-ion battery, but is not limited thereto. The battery cell 20 may be in the shape of a cylinder, a flat body, a cuboid or others.

Figure 3:
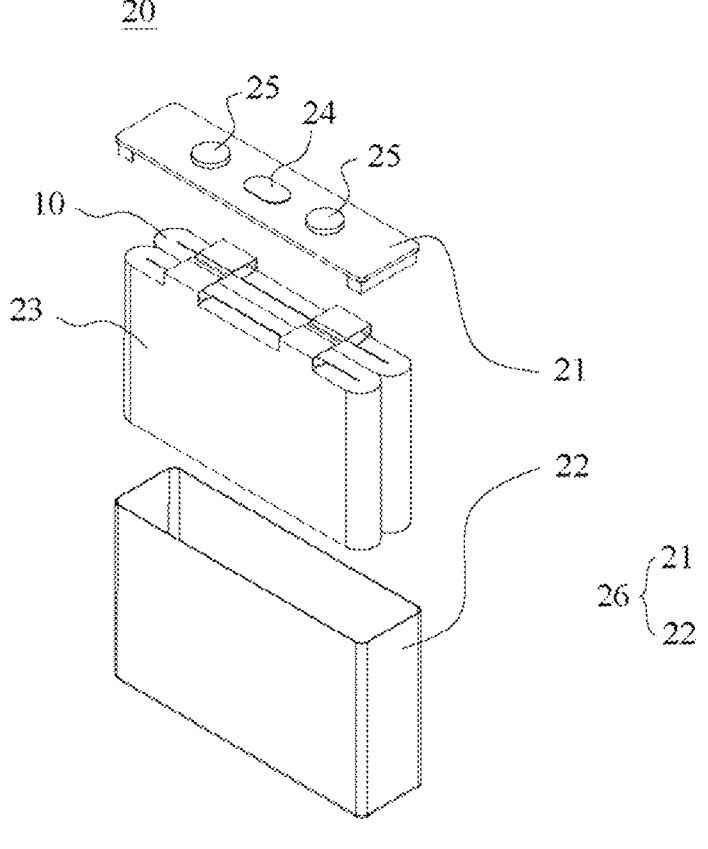
FIG. 3 is an exploded schematic structural diagram of a battery cell according to some embodiments of the present application.

Referring to FIG. 3, and FIG. 3 is a exploded schematic structural diagram of a battery cell 20 provided by some embodiments of the present application. The battery cell 20 refers to the smallest unit constituting a battery. As shown in FIG. 3, the battery cell 20 includes a shell 26, the shell 26 includes an end cover assembly 21, a case 22, an electrode assembly 23 and other functional components.

The end cover assembly 21 refers to a component that covers an opening of the case 22 to isolate the internal environment of the battery cell 20 from the external environment. Without limitation, the shape of the end cover assembly 21 may be adaptive to the shape of the case 22 so as to be matched with the case 22. Optionally, the end cover assembly 21 may be made of a material (e.g., an aluminum alloy) with a certain hardness and strength, accordingly, the end cover assembly 21 is not easily deformed when being subjected to extrusion and collisions, such that the battery cell 20 can have higher structural strength, and the safety performance can also be improved. Functional components such as electrode terminal 25 may be arranged on the end cover assembly 21. The electrode terminal 25 can be used for being electrically connected to the electrode assembly 23 for outputting or inputting electric energy of the battery cell 20. In some embodiments, the end cover assembly 21 may further be provided with a pressure relief mechanism used for relieving internal pressure of the battery cell 20 when the internal pressure or temperature reaches a threshold. The end cover assembly 21 may be made of various materials, such as copper, iron, aluminum, stainless steel, an aluminum alloy and plastic, which is not particularly limited in this embodiment of the present application. In some embodiments, an insulating member may further be arranged on an inner side of the end cover assembly 21, and the insulating member may be used for isolating an electrical connecting component in the case 22 from the end cover assembly 21, thereby reducing the risk of short circuit. Exemplarily, the insulating member may be made of plastic, rubber, etc.

The case 22 is a component used to cooperate with the end cover assembly 21 to form the internal environment of the battery cell 20. The internal environment can be used to accommodate the electrode assembly 23, the electrolyte solution, and other components. The case 22 and the end cover assembly 21 may be separate components, an opening may be formed in the case 22, and at the opening, the opening is covered with the end cover assembly 21 so as to form the internal environment of the battery cell 20. Without limitation, the end cover assembly 21 and the case 22 can also be integrated. Specifically, the end cover assembly 21 and the case 22 may form a common connection surface before other components enter the case. When the interior of the case 22 needs to be encapsulated, the case 22 is covered with the end cover assembly 21. The case 22 may be of various shapes and sizes, such as a rectangular solid, a cylinder and a hexagonal prism. Specifically, the shape of the case 22 may be determined according to the specific shape and size of the electrode assembly 23. The case 22 may be made of various materials, such as copper, iron, aluminum, stainless steel, an aluminum alloy and plastic, which is not particularly limited in this embodiment of the present application.

The electrode assembly 23 is a component in which an electrochemical reaction occurs in the battery cell 20. One or more electrode assemblies 23 may be contained within the case 22. The electrode assembly 23 is mainly formed by winding or stacking a positive electrode plate and a negative electrode plate, and a separator is usually arranged between the positive electrode plate and the negative electrode plate. The portions, with active materials, of the positive electrode plate and the negative electrode plate constitute a main body part of the electrode assembly 23, and the portions, without the active materials, of the positive electrode plate and the negative electrode plate respectively constitute tabs. The positive tab and the negative tab may be located at one end of the main body part together or at two ends of the main body part respectively. In the charging and discharging process of the battery, the positive electrode active material and the negative electrode active material react with the electrolyte solution, and the tabs are directly or indirectly connected to the electrode terminals 25 to form a current loop.

Figure 4:
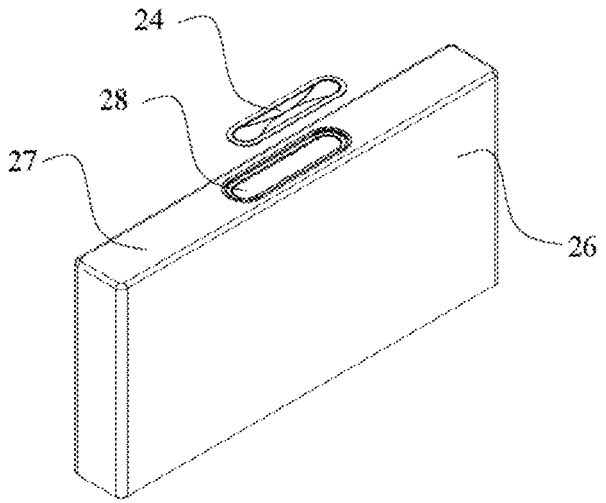
FIG. 4 is a schematic structural diagram of a battery cell according to some other embodiments of the present application.
Figure 5:
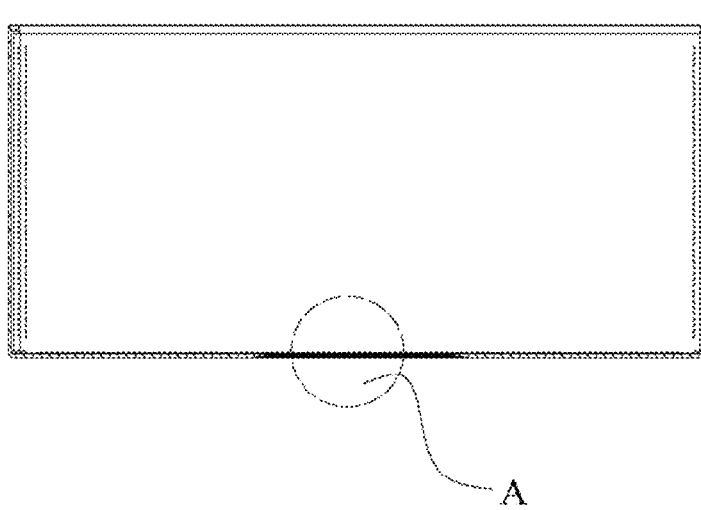
FIG. 5 is a schematic diagram of the cross-sectional structure of a shell according to some embodiments of the present application.
Figure 6:
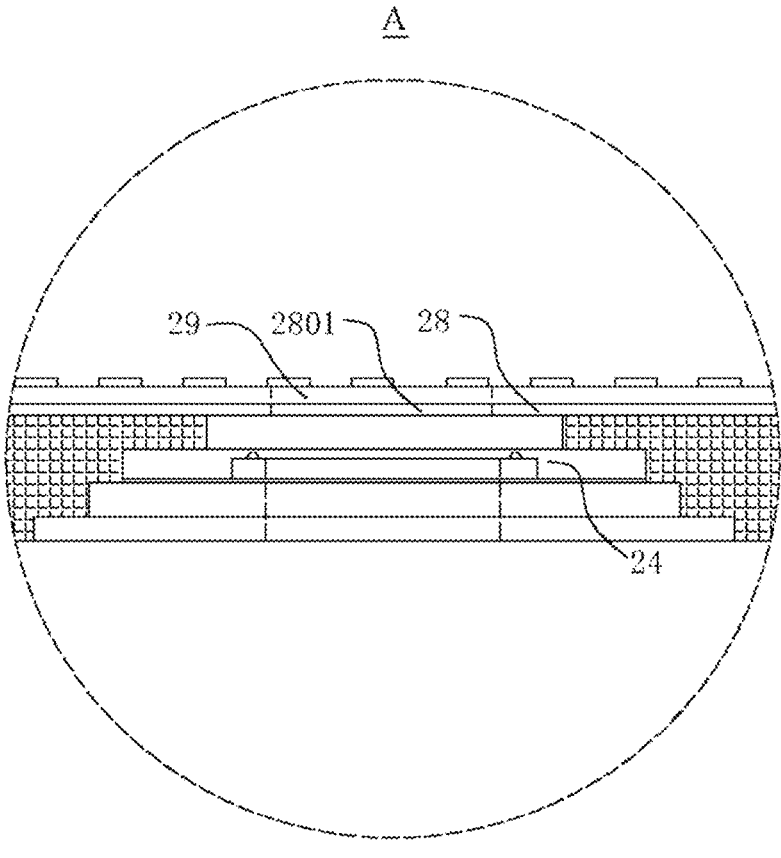
FIG. 6 is a schematic enlarged diagram of the pressure relief mechanism shown in FIG. 5 at a circle A.
Figure 7:
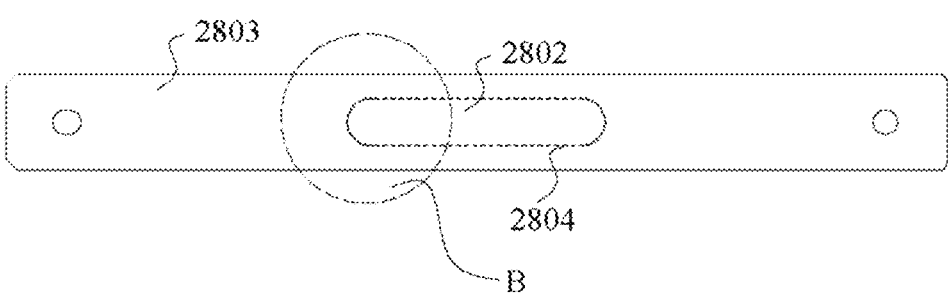
FIG. 7 is a schematic structural diagram of a support plate according to some embodiments of the present application.
Figure 8:
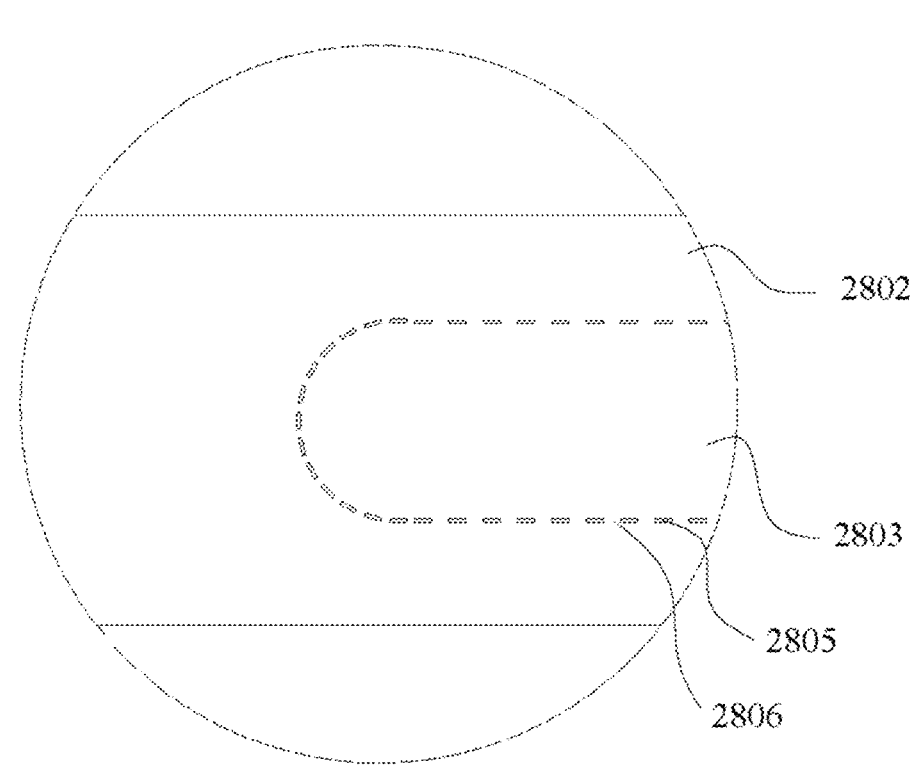
FIG. 8 is a schematic structural diagram of the support plate shown in FIG. 7 at a circle B.

Please refer to FIGS. 4 to 8. FIG. 4 is a schematic structural diagram of a battery cell 20 in some other embodiments of the present application; FIG. 5 is a schematic diagram of the cross-sectional structure of a shell 26 in some embodiments of the present application; FIG. 6 is a schematic enlarged diagram of the pressure relief mechanism 24 shown in FIG. 5 at a circle A; FIG. 7 is a schematic structural diagram of a support plate 28 in some embodiments of the present application; FIG. 8 is a schematic structural diagram of the support plate 28 shown in FIG. 7 at a circle B.

As shown in FIGS. 3 and 4, the battery cell 20 in the embodiment of the present application includes an electrode assembly 23, a shell 26, a pressure relief mechanism 24 and a support plate 28. The shell 26 is used to accommodate the electrode assembly 23 and includes a first side plate 27. The pressure relief mechanism 24 is disposed on the first side plate 27 and is configured to be actuated when the internal pressure of the battery cell 20 reaches a first threshold, so as to release the internal pressure. The support plate 28 is disposed between the first side plate 27 and the electrode assembly 23. The support plate 28 is provided with a weak portion 2801. The weak portion 2801 is opposite to the pressure relief mechanism 24 in the thickness direction of the first side plate 27. The shape of the weak portion 2801 is the same as that of the outline of the pressure relief mechanism 24, the external dimension of the weak portion 2801 is not larger than the dimension of the outline of the pressure relief mechanism 24, and the support plate 28 is configured to rupture along the weak portion 2801 when the internal pressure of the battery cell 20 reaches a second threshold to form a channel for guiding fluid to the pressure relief mechanism 24.

The pressure relief mechanism 24 can be disposed on the side of the battery cell 20 or at the bottom of the battery cell 20. The selection is based on specific design requirements and is not limited here. In the embodiment of the present application, the pressure relief mechanism 24 is provided at the bottom of the battery cell 20. The pressure relief mechanism 24 is provided at the bottom of the battery cell 20. When the internal pressure of the battery cell 20 reaches the first threshold, the internal fluid is ejected toward the bottom, which can prevent the ejected fluid from harming the surrounding equipment or operators. The outline of the support plate 28 is the same as that of the first side plate 27, and can provide stable support for the electrode assembly 23 inside the battery cell 20. In the technical solution of the embodiment of the present application, by arranging a weak portion 2801 on the support plate 28 and arranging the weak portion 2801 corresponding to the pressure relief mechanism 24, the fluid released by the battery cell 20 during thermal runaway can be guided to the pressure relief mechanism 24, so that the pressure relief mechanism 24 is actuated in time and releases the fluid. Moreover, the shape of the weak portion 2801 is the same as that of the outline of the pressure relief mechanism 24, and the external dimension of the weak portion 2801 is not larger than the dimension of the outline of the pressure relief mechanism 24, which can ensure that the fluid is accurately guided to the pressure relief mechanism 24, and uneven pressure release caused by fluid deposition in the shell 26 can be prevented. Therefore, the above components can effectively increase the discharge rate when the battery cell 20 undergoes thermal runaway, and improve the safety performance of the battery cell 20.

In some embodiments of the present application, the first threshold P1 and the second threshold P2 satisfy the relationship P2<P1. According to the embodiment of the present application, the second threshold at which the support plate 28 ruptures is set to be less than the first threshold at which the pressure relief mechanism 24 ruptures, which can ensure that under the same internal pressure condition, the weak portion 2801 on the support plate 28 ruptures before the pressure relief mechanism 24, or the weak portion 2801 on the support plate 28 and the pressure relief mechanism 24 can rupture at the same time, thereby ensuring that the fluid in the battery cell 20 can be discharged smoothly.

Specifically, please refer to FIG. 5 and FIG. 6, the support plate 28 is arranged adjacent to the pressure relief mechanism 24. The weak portion 2801 on the support plate 28 is in contact with the pressure relief mechanism 24. If the second threshold is set to be less than the first threshold, after the internal pressure of the battery cell 20 exceeds the second threshold, the pressure relief mechanism 24 will not rupture, but the weak portion 2801 on the support plate 28 will rupture. However, since the support plate 28 is in contact with the pressure relief mechanism 24 and the pressure relief mechanism 24 blocks the displacement of the weak portion 2801, the support plate 28 can still maintain its original shape under the support force of the pressure relief mechanism 24 after the weak portion 2801 ruptures. When the internal pressure of the battery cell 20 exceeds the first threshold, the weak portion 2801 on the support plate 28 and the pressure relief mechanism 24 will rupture one after another. The pressure relief mechanism 24 is opened, providing a displacement space for the weak portion 2801, and the weak portion 2801 also ruptures smoothly. A channel for fluid to pass through is formed on the support plate 28. Therefore, the above arrangement can ensure that after the pressure relief mechanism 24 ruptures, the weak portion 2801 will also rupture smoothly, ensuring smooth passage of the internal fluid.

In some embodiments of the present application, as shown in FIG. 7, the support plate 28 includes a first portion 2802, a second portion 2803 and a first weak portion 2804, the first portion 2802 is disposed opposite to the pressure relief mechanism 24, the second portion 2803 surrounds the outside of the first portion 2802, and the first weak portion 2804 is connected between the first portion 2802 and the second portion 2803.

In the above structure, the first portion 2802 and the second portion 2803 are connected by providing the first weak portion 2804. The strength of the first weak portion 2804 is less than that of the first portion 2802 and the second portion 2803, so rupture may occur after the internal pressure of the battery cell 20 reaches the second threshold. When the internal pressure of the battery cell 20 does not exceed the second threshold, the structure of the support plate 28 is ensured, and the second portion 2803 is arranged to surround the outside of the first portion 2802. When the internal pressure of the battery cell 20 exceeds the second threshold, the second portion 2803 is uniformly stressed in the circumferential direction and ruptures smoothly. Rupture means that the first portion 2802 and the second portion 2803 are at least partially separated, and a channel or opening for the internal fluid of the battery cell 20 to pass through is formed on the support plate 28 at a position corresponding to the pressure relief mechanism 24.

In some embodiments of the present application, please refer to FIG. 8, the battery cell 20 further includes an insulating sheet 29, the insulating sheet 29 includes a third portion 2901, a fourth portion 2902 and a second weak portion 2903. The third portion 2901 is disposed opposite to the first portion 2802, the fourth portion 2902 surrounds the outside of the third portion 2901, and the second weak portion 2903 is connected between the third portion 2901 and the fourth portion 2902.

In the above structure, the third portion 2901 and the fourth portion 2902 are connected by arranging the second weak portion 2903. The strength of the second weak portion 2903 is less than that of the first portion 2802 and the second portion 2803, so rupture may occur after the internal pressure of the battery cell 20 reaches a preset threshold. The preset threshold set in the present application may be the second threshold, that is, the rupture stress of the second weak portion 2903 is set to be equal to that of the first weak portion 2804. This arrangement can ensure that the insulating sheet 29 and the support plate 28 will rupture at the same time when the internal pressure reaches a certain value, thereby improving the rupture efficiency. The above-mentioned preset threshold can also be set to be slightly less than the second threshold, so that the fluid first breaks through the second weak portion 2903 and then breaks through the first weak portion 2804. When the internal pressure of the battery cell 20 does not exceed the second threshold, the normal structural form of the insulating sheet 29 is maintained. Moreover, the fourth portion 2902 is arranged to surround the outside of the third portion 2901, and when the internal pressure of the battery cell 20 exceeds the second threshold, the fourth portion 2902 is uniformly stressed in the circumferential direction and ruptures smoothly. The above threshold can also be set to be different from the second threshold. The specific setting method can be carried out according to the structure of the insulating sheet 29 and the support plate 28. The size of the preset threshold is not limited here.

In some embodiments of the present application, the orthographic projection of the first weak portion 2804 on the first side plate 27 completely falls within the range of the pressure relief mechanism 24. In the above structure, the first weak portion 2804 is disposed opposite to the pressure relief mechanism 24, and within the range corresponding to the pressure relief mechanism 24 in the thickness direction of the first side plate 27, after the first weak portion 2804 ruptures, the first portion 2802 is at least partially detached from the second portion 2803, a through hole is formed in the support plate 28, and the fluid in the battery cell 20 can flow to the pressure relief mechanism 24 along the through hole. Therefore, the above structure can better guide the flow of the internal fluid.

In some optional embodiments, the outline size of the first weak portion 2804 is smaller than the outline size of the pressure relief mechanism 24. For example, when the pressure relief mechanism 24 and the first weak portion 2804 are both square or rectangular, the width dimension of the first weak portion 2804 is 1 mm to 3 mm narrower than the width dimension of the pressure relief mechanism 24, and the length dimension of the first weak portion 2804 is 1 mm to 3 mm shorter than the length dimension of the pressure relief mechanism 24. The above design can limit the flow direction of the fluid while ensuring the smooth outflow of the internal fluid.

Furthermore, the orthographic projection of the second weak portion 2903 on the first side plate 27 completely falls within the range of the pressure relief mechanism 24. The second weak portion 2903 can also be disposed opposite to the pressure relief mechanism 24, and within the range corresponding to the pressure relief mechanism 24 in the thickness direction of the first side plate 27, after the second weak portion 2903 ruptures, the third portion 2901 is at least partially detached from the fourth portion 2902, a through hole is formed in the insulating sheet 29, and the fluid in the battery cell 20 can flow to the pressure relief mechanism 24 along the through hole. Therefore, the above structure can better guide the flow of the internal fluid.

In some embodiments of the present application, please refer to FIG. 7 and FIG. 8, the support plate 28 includes a plurality of first through holes 2805 spaced along the circumference of the first portion 2802, and the first through hole 2805 penetrates through the support plate 28 along the thickness direction of the first side plate 27; a first connecting section 2806 exists between two adjacent first through holes 2805, and a plurality of first connecting sections 2806 and a plurality of first through holes 2805 are alternately arranged along the circumference of the first portion 2802 and form the first weak portion 2804.

In the above structure, the first connecting section 2806 is arranged to connect the first portion 2802 and the second portion 2803, so as to ensure the integrity of the structure of the support plate 28 before it ruptures and ensure the support function of the support plate 28 for the electrode assembly 23. The first through hole 2805 is provided to reduce the strength of the first weak portion 2804 of the support plate 28, so as to ensure that the first portion 2802 can be smoothly detached from the second portion 2803 along the first weak portion 2804 when the internal pressure of the battery cell 20 reaches the second threshold. Moreover, the above method is convenient to manufacture and easy to operate.

Specifically, by changing the length of the first through hole 2805, the minimum stress under which the first weak portion 2804 ruptures can be adjusted. For example, when the first through hole 2805 is extended, the corresponding connection strength of the first connecting section 2806 is reduced, so the minimum stress under which the first weak portion 2804 ruptures is correspondingly reduced, and conversely, the minimum stress under which the first weak portion 2804 ruptures is increased accordingly. Or if the density of the first through holes 2805 is increased, the connection strength of the corresponding first connecting section 2806 will also be reduced. On the contrary, the minimum stress under which the first weak portion 2804 ruptures will increase accordingly. The above design is related to factors such as the material and thickness of the support plate 28 and can be set according to specific conditions, which will not be described in detail here.

Figure 9:
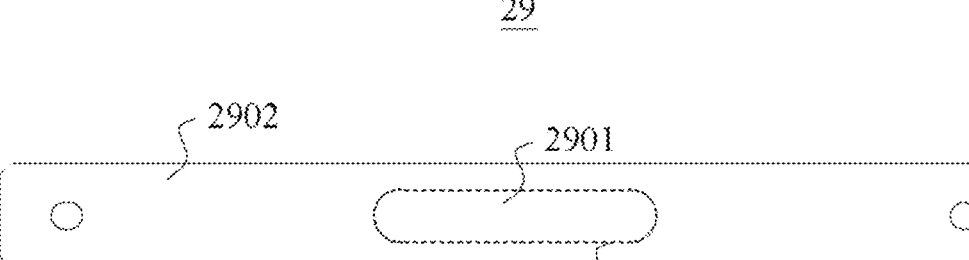
FIG. 9 is a schematic structural diagram of an insulating sheet according to some embodiments of the present application.

In some embodiments of the present application, as shown in FIG. 9, the insulating sheet 29 includes a plurality of second through holes arranged along the circumference of the third portion 2901, and the second through hole penetrates through the insulating sheet 29 along the thickness direction of the first side plate 27; a second connecting section exists between two adjacent second through holes, and a plurality of second connecting sections and a plurality of second through holes are alternately arranged along the circumference of the third portion 2901 and form the second weak portion 2903.

In the above embodiment, by arranging the second connecting section, the third portion 2901 and the fourth portion 2902 are connected to ensure the structural integrity of the insulating sheet 29 before it ruptures and the insulation performance between the electrode assembly 23 and the shell 26; and arranging the first through holes 2805 reduces the strength of the second weak portion 2903 and ensures that the third portion 2901 can be smoothly detached from the fourth portion 2902 along the second weak portion 2903 when the internal pressure of the battery cell 20 reaches the second threshold. Specifically, by changing the length of the second through hole, the minimum stress under which the second weak portion 2903 ruptures can be adjusted. The design of the minimum stress for the second weak portion 2903 is related to factors such as the material and thickness of the insulating sheet 29 and can be set according to specific conditions, which will not be described again here.

In some embodiments of the present application, the thickness of the first connecting section 2806 is less than the thickness of the second portion 2803, and/or the thickness of the second connecting section is less than the thickness of the fourth portion 2902. By reducing the thickness of the first connecting section 2806, the connection strength between the first portion 2802 and the second portion 2803 is reduced, so that the connection strength between the third portion 2901 and the fourth portion 2902 can be changed by adjusting the thickness of the second connecting section.

In some embodiments of the present application, the orthographic projection of the second weak portion 2903 on the support plate 28 completely falls within the range of the first portion 2802. Specifically, the second weak portion 2903 is provided corresponding to the first portion 2802, and after the third portion 2901 ruptures, an opening or channel for fluid to pass through is formed on the insulating sheet 29. The area of the second weak portion 2903 in the thickness direction of the first side plate 27 is less than that of the first portion 2802, so the area of the above-mentioned opening or channel is also less than that of the first portion 2802. The above structure can centrally guide the fluid inside the battery cell 20 to the through hole after the first portion 2802 of the support plate 28 is detached, which plays a role of guiding the flow and ensures the insulation performance of the insulating plate.

In some embodiments of the present application, the orthographic projections of the plurality of second through holes on the support plate 28 and the plurality of first through holes 2805 are staggered on the support plate 28. By arranging the first through holes 2805 and the second through holes in a staggered distribution, the creepage distance from the electrode assembly 23 to the shell 26 can be effectively increased, leakage of electricity can be reduced, and the insulation performance of the insulating sheet 29 can be ensured.

Figure 10:
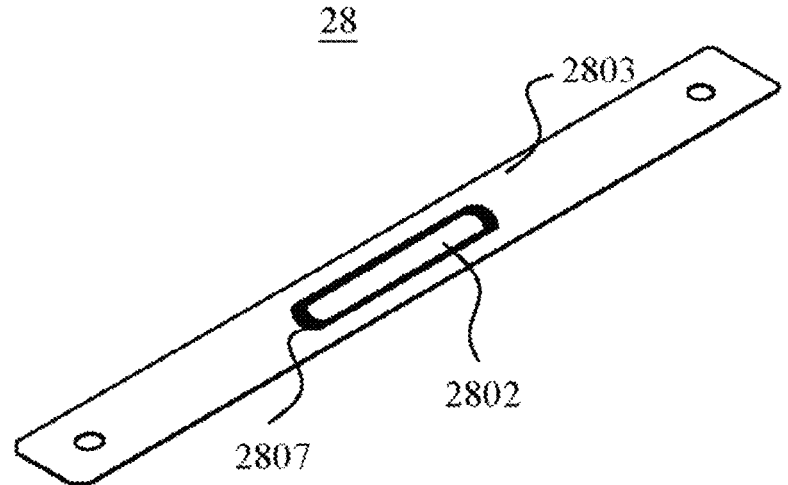
FIG. 10 is a schematic structural diagram of a first groove according to some embodiments of the present application.

In some embodiments of the present application, as shown in FIG. 10, in the thickness direction of the first side plate 27, the surface of the first weak portion 2804 facing the first side plate 27 is recessed in a direction away from the first side plate 27 relative to the surface of the first portion 2802 facing the first side plate 27 to form a first groove 2807, or the surface of the first weak portion 2804 facing the electrode assembly 23 is recessed in a direction away from the electrode assembly 23 relative to the surface of the first portion 2802 facing the electrode assembly 23 to form a first groove 2807, or the surfaces facing the electrode assembly 23 and away from the electrode assembly 23 of the first weak portion 2804 are simultaneously recessed inward to form a first groove 2807. Specifically, the above structure reduces the thickness of the first weak portion 2804 by arranging the first weak portion 2804 as an inwardly concave first groove 2807, thereby reducing the connection strength of the first weak portion 2804, making the first weak portion 2804 can rupture smoothly when the internal pressure reaches the second threshold, and the above structure is convenient for production and operation.

In some embodiments of the present application, in the thickness direction of the first side plate 27, the surface of the second weak portion 2903 facing the first side plate 27 is recessed in a direction away from the first side plate 27 relative to the surface of the first portion 2802 facing the first side plate 27 to form a second groove, or the surface of the second weak portion 2903 facing the electrode assembly 23 is recessed in a direction away from the electrode assembly 23 relative to the surface of the first portion 2802 facing the electrode assembly 23 to form a second groove, or the surfaces facing the electrode assembly 23 and away from the electrode assembly 23 of the second weak portion 2903 are simultaneously recessed inward to form a second groove. By arranging the second weak portion 2903 as an inwardly concave groove, the thickness of the second weak portion 2903 is reduced, and the connection strength of the second weak portion 2903 is reduced, so that the second weak portion 2903 can rupture smoothly when the internal pressure reaches the second threshold. It can be understood that configuring the second weak portion 2903 as a second groove can reduce the thickness of the first weak portion 2804 and reduce the connection strength of the second weak portion 2903. It can also make the second weak portion 2903 rupture smoothly when the internal pressure reaches the preset threshold, and the above structure is convenient for production and operation.

In some embodiments of the present application, the orthographic projection of the first weak portion 2804 on the first side plate 27 is any one of circular, elliptical, square and racetrack shape, and/or the orthographic projection of the second weak portion 2903 on the first side plate 27 is any one of circular, elliptical, square and racetrack shape. In the above structure, the weak portion 2801 is designed into a specific shape to facilitate production.

In some optional embodiments, both the first weak portion 2804 and the second weak portion 2903 can be designed in a square shape. The width dimension of the second weak portion 2903 is 0.5 mm to 1.0 mm narrower than the width dimension of the first weak portion 2804, and the length dimension of the second weak portion 2903 is 0.5 mm to 1.0 mm shorter than the length dimension of the first weak portion 2804. Alternatively, both the first weak portion 2804 and the second weak portion 2903 can be designed to be circular, and the diameter of the second weak portion 2903 is 0.5 mm to 1.0 mm smaller than the diameter of the first weak portion 2804. The above structure can limit the flow direction of the internal fluid while ensuring the smooth outflow of the fluid.

According to some embodiments of the present application, the present application further provides a battery 100 including the battery cell 20 described in any one of the above solutions.

According to some embodiments of the present application, the present application further provides an electrical apparatus including the battery 100 described in any one of the above solutions, the battery 100 being used to provide electric energy to the electrical apparatus. The electrical apparatus may be any of the aforementioned devices or systems in which the battery 100 is applied.

Finally, it should be noted that the above embodiments are merely used for illustrating rather than limiting the technical solutions of the present application. Although the present application has been described in detail with reference to the above various embodiments, those of ordinary skill in the art should understand that the technical solutions specified in the above various embodiments can still be modified, or some or all of the technical features therein can be equivalently substituted; and such modifications or substitutions do not make the essence of the corresponding technical solutions depart from the scope of the technical solutions of the various embodiments of the present application, which shall fall within the scope of the claims and the specification of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A battery cell, comprising:
an electrode assembly;
a shell for accommodating the electrode assembly and including a first side plate;
a pressure relief mechanism provided on the first side plate, the pressure relief mechanism being configured to be actuated when an internal pressure of the battery cell reaches a first threshold, so as to release the internal pressure; and
a support plate arranged between the first side plate and the electrode assembly, wherein the support plate is provided with a weak portion which is opposite to the pressure relief mechanism in a thickness direction of the first side plate, a shape of the weak portion is the same as that of an outline of the pressure relief mechanism, an external dimension of the weak portion is not larger than the dimension of the outline of the pressure relief mechanism, and the support plate is configured to rupture along the weak portion when the internal pressure of the battery cell reaches a second threshold, so as to form a channel for guiding fluid to the pressure relief mechanism;

wherein the support plate includes a first portion, a second portion and a first weak portion, the first portion is arranged opposite to the pressure relief mechanism, the second portion surrounds an outside of the first portion, and the first weak portion is connected between the first portion and the second portion; and wherein the support plate includes a plurality of first through holes spaced along a circumference of the first portion, and the first through hole penetrates through the support plate along the thickness direction of the first side plate; a first connecting section exists between two adjacent first through holes, a plurality of first connecting sections and a plurality of first through holes are alternately arranged along the circumference of the first portion and form the first weak portion.

2. The battery cell according to claim 1, wherein the first threshold P1 and the second threshold P2 satisfy a relationship P2<P1.

3. The battery cell according to claim 1, further comprising an insulating sheet, wherein the insulating sheet comprises a third portion, a fourth portion and a second weak portion, the third portion is arranged opposite to the first portion, the fourth portion surrounds an outside of the third portion, and the second weak portion is connected between the third portion and the fourth portion.

4. The battery cell according to claim 3, wherein an orthographic projection of the first weak portion on a first side plate completely falls within a range of the pressure relief mechanism, and/or the orthographic projection of the second weak portion on the first side plate completely falls within the range of the pressure relief mechanism.

5. The battery cell according to claim 3, wherein the insulating sheet includes a plurality of second through holes arranged along the circumference of the third portion, and the second through hole penetrates through the insulating sheet along the thickness direction of the first side plate; a second connecting section exists between two adjacent second through holes, and a plurality of second connecting sections and a plurality of second through holes are alternately arranged along the circumference of the third portion and form the second weak portion.

6. The battery cell according to claim 5, wherein a thickness of the first connecting section is less than the thickness of the second portion, and/or the thickness of the second connecting section is less than the thickness of the fourth portion.

7. The battery cell according to claim 3, wherein the orthographic projection of the second weak portion on a support plate completely falls within the range of the first portion.

8. The battery cell according to claim 5, wherein orthographic projections of the plurality of second through holes on the support plate and the plurality of first through holes are staggered on the support plate.

9. The battery cell according to claim 3, wherein in the thickness direction of the first side plate, a surface of the first weak portion facing the first side plate is recessed in a direction away from the first side plate relative to the surface of the first portion facing the first side plate, and/or the surface of the first weak portion facing the electrode assembly is recessed in a direction away from the electrode assembly relative to the surface of the first portion facing the electrode assembly.

10. The battery cell according to claim 3, wherein in the thickness direction of the first side plate, the surface of the second weak portion facing the first side plate is recessed in a direction away from the first side plate relative to the surface of the first portion facing the first side plate, and/or the surface of the second weak portion facing the electrode assembly is recessed in a direction away from the electrode assembly relative to the surface of the first portion facing the electrode assembly.

11. The battery cell according to claim 3, wherein the orthographic projection of the first weak portion on the first side plate is any one of circular, elliptical, square and racetrack shape, and/or the orthographic projection of the second weak portion on the first side plate is any one of circular, elliptical, square and racetrack shape.

12. A battery comprising the battery cell of claim 1.

13. An electrical device comprising the battery of claim 12, the battery being used for providing electric energy.

* * * * *